United States Patent [19]

Daneshvar

[11] Patent Number: 5,378,042
[45] Date of Patent: Jan. 3, 1995

[54] BALLOONS AND HEAD WRAPS FOR A SEATED USER

[76] Inventor: Yousef Daneshvar, 33200 Slocum, Farmington, Mich. 48024

[21] Appl. No.: 896,981

[22] Filed: Jun. 11, 1992

[51] Int. Cl.⁶ .............................................. A47C 7/38
[52] U.S. Cl. ...................... 297/393; 602/13; 602/17; 607/109; 128/847
[58] Field of Search ............... 297/383, 391, DIG. 3; 5/644; 128/380, 847; 2/171.2, DIG. 11; 607/109; 602/13, 17

[56] References Cited

U.S. PATENT DOCUMENTS

| | | | |
|---|---|---|---|
| 1,580,210 | 4/1926 | McCulloch | 5/644 |
| 1,861,668 | 6/1932 | Tenney | 5/644 |
| 2,562,121 | 7/1951 | Poux | 607/109 |
| 2,688,142 | 9/1954 | Jensen | 5/644 |
| 3,052,236 | 9/1962 | Schrieber | 602/13 |
| 4,339,151 | 7/1982 | Riggs | 297/393 |
| 4,576,150 | 3/1986 | Aracher | 128/75 |
| 4,622,957 | 11/1986 | Curlee | 602/13 |
| 4,679,263 | 7/1987 | Honer | 297/393 |
| 4,682,587 | 7/1987 | Curlee | 602/13 |
| 4,682,588 | 7/1987 | Curlee | 602/13 |
| 4,707,031 | 11/1987 | Meistrell | 297/393 |
| 4,738,488 | 4/1988 | Camelio | 297/391 |
| 5,152,302 | 10/1992 | Fareed | 602/13 |
| 5,171,209 | 12/1992 | Gamba | 602/13 |

Primary Examiner—Alexander Grosz

[57] ABSTRACT

A device adapted to support the head of a seated user relative to a generally upstanding portion of a seat, stroller, or the like, has a strap adapted to encircle the head of the user and the generally upstanding portion. The strap contains a plurality of inflatable balloons having generally flat rear surfaces and expandable frontal surfaces, whereby upon inflation the generally flat rear surfaces of the balloons remain flat, and the frontal surfaces bulge outwardly from the rear surfaces to contact and support the user's head.

9 Claims, 7 Drawing Sheets

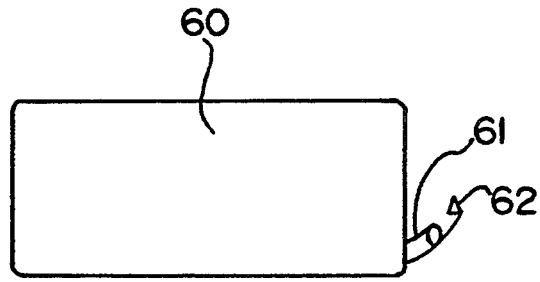
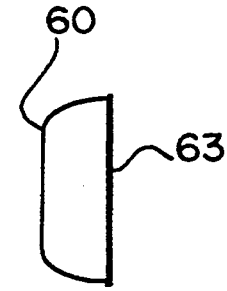
FIG. 17        FIG. 18
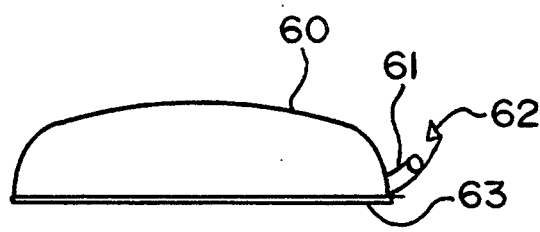
FIG. 19
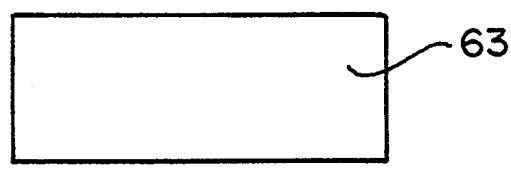
FIG. 20
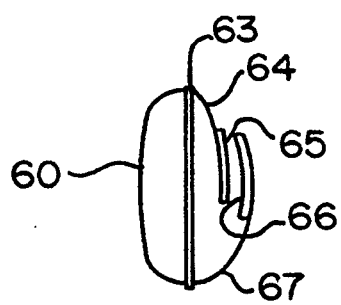
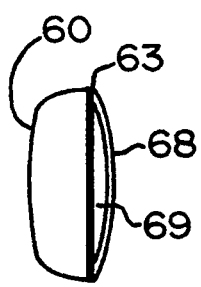
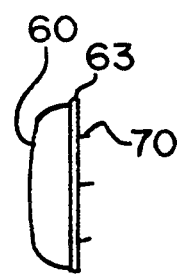
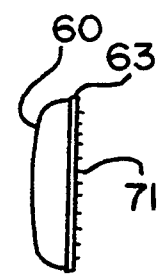
FIG. 21    FIG. 22    FIG. 23    FIG. 24

BALLOONS AND HEAD WRAPS FOR A SEATED USER

THE BACKGROUND

This invention was made after my observation of some annoying scenes which made me find a solution. I noticed my own and other little children's heads drop while sleeping in strollers or car seats. In these circumstances, the child's head falls either forward or to the side, being in very wrong positions of one sort or another. This caused very uncomfortable feelings inside me and finally made me find a solution for it. I have invented the "Head Wrap" which goes around the head and prevents such problems.

I also had many patients with neck pain and multiple injuries after car accidents which made me again believe that there was a need for a better solution, and I believe my invention, the "Head Wrap", as well as the rest of my inventions, will be quite helpful in preventing the head from going forward in car accidents and damaging the neck, when used appropriately. Many patients complaining from back pain after cardiac catheterization or some surgeries made me think about using balloons for prevention of such problems too. Overall, I believe that my inventions, although simple, will be very useful in helping patients and preventing pain and bad feelings of human beings, and that is what I look for.

BRIEF SUMMARY OF INVENTION

This invention is based on a simple basic device: a specially designed balloon that is modified to make many useful devices and units from it. Primarily, it consists of a half balloon made from rubber or plastic which has a flat face on one side and a bulging surface on the other. It can be made in different shapes and sizes. Multiple devices I will mention here are made from such basic unit with slightly different but very important application. This balloon when made in the right size and shape will fit the curvature of the back and can be placed in the back of chairs in the back or neck area to support them and to give comfort to the patient. It can be placed on operating tables or special exam tables such as cardiac catheterization lab tables to prevent back pain in patients. A hard cover in the face of this balloon will prevent it from bulging in the wrong direction to hurt the soft tissue to the sides.

A large balloon similar to one mentioned previously can be stuck to the back of the seat of the cars and inflated to prevent severe injury to the face if accidents occur.

It can be used as a very important device, "Head Wrap", to hold the head in the right position, preventing it from assuming the wrong position. The head wrap is made from a strap with a surface covered with one or multiple balloons or soft materials or sponges, allowing the front and sides of the head to lean against them. This part will be used wherever it can be helpful: for example, in strollers and in the car seats, etc. It can be used in cars to prevent severe damages. It may be made from a strong metal band covered with sponges soft cover or balloons.

BRIEF DESCRIPTION OF DRAWINGS

FIG. 17 shows a front view of a balloon similar to one shown in FIG. 3.

FIG. 18 shows the cross cut view of the FIG. 17 balloon.

FIG. 19 shows a longitudinal cross cut view of the FIG. 17 balloon.

FIG. 20 shows the back view of the FIG. 17 balloon.

FIG. 21 shows the cross cut side view of a balloon similar to one mentioned in FIG. 17.

FIG. 22 shows the cross cut side view of a balloon similar to one mentioned in FIG. 17.

FIG. 23 shows the cross cut side view of a balloon similar to one mentioned in FIG. 17.

FIG. 24 shows the cross cut view of the balloon unit in FIG. 17.

DETAILED DESCRIPTION

Figure 1:
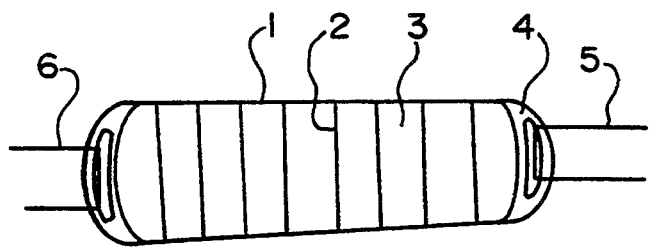
FIG. 1 shows the front view of a first embodiment of balloon.
Figure 2:
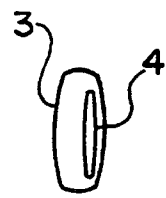
FIG. 2 shows the side view of the balloon shown in FIG. 1.

This invention is based on a unit made from a balloon. The basic unit is a balloon made from pressure resistant plastic or rubber that has a rather rectangular flat shape. One surface of this balloon will be flat and may have a rather hard, resistant surface such as thick plastic or rubber with a surface with lines in different directions to prevent the balloon from slipping. In some cases, it may have small suction cups to hold it in place. The other surface of this unit will be covered with balloons that will bulge with inflation to assume balloon shape. In some cases, it may be permanently inflated and sealed, but mostly could be inflated for use via an inflation port. This balloon can be held in place either by straps connected to its own ends or attached to its hard back, or by the straps connected to its cover. The balloon may also have a tunnel type space in its flat back to allow straps to go through it. Or, it can be held in place with the use of Velcro TM patches attached to its back.

In most commonly used shapes, it has one flat rear surface, and the other front surface which will bulge forward with inflation to assume shape of something similar to half sausage when the sausage is cut longitudinally and to serve as a soft protective cushion for the parts of body that come in contact with it or stand against it. A soft, non-irritating cover over the balloons will prevent irritation of the skin. One or multiple layers of sponge may also cover the balloon to make its surface more comfortable and/or more protective against the pressure. This unit may consist of only one balloon or it may be made from multiple balloon units next to each other. These balloons could be in layers and to be horizontal or vertical layers, or may have both horizontal and vertical walls between them to allow the pressure to be tolerated much better. These balloons may be connected to each other or they may have different inflation ports and to be connected to each other serially to prevent deflation of all of them simultaneously if one of them ruptured.

The following explanations are to describe how this balloon can be made in different shapes with slight modifications and sizes to serve many useful purposes.

Inflatable Back Pillow

This is like half of a small pillow. In this case, the flat part of the balloon is to face the front part of the seat, and to be held stable. It will be held in place by straps coming from each side and connecting to each other, or by Velcro TM patches, one of which will be stuck to the front of the seat and the other to the back of the balloon. Or, glues may be used to attach the balloon permanently to a surface. Or, pins that can be part of the hard back cover of these balloons may be used to stick to the surface of the seat, or similar place that it is supposed to stick to.

This unit can be used to help patients who have a back problem and have to lie down on places such as on a table of a cardiac catheterization lab or an operating room table where they may otherwise suffer significantly from the circumstances and the position. It can be placed on the top of the operating table or table of cardiac catheterization lab and be inflated to the right size to help the patient. This balloon may be made to be filled with water, and especially when it is made from heat-resistant plastic, then it can be filled with warm water to help even more for a patient's back.

In order to prevent soft tissue pressure and damage in one model of this balloon, the front surface will have a rather thick rubber or plastic cover that will give special shape to it in order to fit the curvature of back with a curve in its longitudinal axis as well as a curve in its horizontal axis. The surface of this rubber or plastic may be covered with fabric or sponge to make it likeable and comfortable. And, this is to prevent the bulging of the balloon to cause pressure to the kidneys and soft tissues in the lumbar areas.

A smaller unit can also be made in order to be used for comfort of the neck and be placed in the area in the level of back of the neck on the back of the car seat to give a nice feeling in that area.

The shape of the device and its size can be adjusted with the amount of the air in the balloon.

The Balloon for the Back of Seats

Before I mention this unit, I would like to mention the problem of having an accident occur when the person is in deep sleep in a car, bus or train. We can imagine that the impact of a free motion of the head hitting the back of the front seat can be totally devastating, and the thought and imagination of such an event can be enough to make a person not want to go into a deep, comfortable sleep. In my view, this can be avoided with the use of a balloon similar to the one mentioned earlier in this application. Except that it has to be made big enough to leave little room between the person in the chair and the wall and window or back of the seat in front of it. I believe this will be especially very useful on long trips when a person sleeps and an accident could be devastating, since the person will move forward practically without much resistance to suffer from the severe damages.

This balloon may be connected to the back of the front seat in cars, either permanently or temporarily, by use of straps or Velcro TM patches. This unit, when inflated, will be very useful in preventing the uncontrolled striking of the front of the head to the back of the front seat. In my mind, this piece, when in place, will give reasonable peace of mind as well as protection to the passenger of the car in rear seats or in the bus who wants to sleep and feel safe too.

Head Wrap

This device is made from a strap covered with small-sized balloons similar to one previously mentioned and will be held in place by wrapping the straps around the head. This will make a unit that can be used to prevent drop of head of children, while they sleep in strollers or in the car seats, etc.

The prototype model will be a strong strap made from synthetic material similar to the safety belts of cars. And, it will have a surface that will be covered with balloons: one in front and one in each side. The purpose of these balloons is to hold the head in the right position in circumstances such as when a baby is sitting and sleeping in a stroller or car seat, etc. And, also to protect the head from sudden uncontrolled motion such as in car accidents.

The front balloon is to stand in front of the front of the head and the side balloons for the right and left sides of the head. These balloons can be inflated by an inflation port and then the port is sealed by a small matching plug. The balloons may be connected to each other or may have different areas for inflation to prevent from deflation of all of them simultaneously when one is perforated. The balloons may also be made from a combination of many smaller balloons. The balloons may have a cover from a soft fabric, and/or they may have layers of sponges to make their surface soft and more protective. FIG. 25A shows balloon 80 to comprise such a soft fabric cover SFC and such a sponge layer SPL. The ends of the straps will have a patch of Velcro TM to allow them to stick to each other when they come together. To make the connection stronger, one end of the strap may come and go through a snap on the other end, make a U-turn, and then come and stick to a matching piece of Velcro TM in its own back. Similar simple ways, such as snaps, may also be used for this purpose. One small strap may also go from the top border of each side strap, coming together over the head, to be stuck together by Velcro TM to prevent the straps from falling down from their place.

In some models, the side balloons may be large enough to come to the sides of the face to cover them and the side balloons may come together with the use of a narrow strap that comes from the bottom end of the support of the side balloons, to stick to each other with use of Velcro TM patches to hold them together. This lower part of the side balloons may be folded to stand in the outer surface of the side parts when they are not to be used and to be folded down when they need to be used. These models may also have a smaller strap to go from top border of each side strap coming together over the head to be stuck together by Velcro TM to prevent the straps from falling down from their place.

In some models, the side balloons may have a lower part that will have different openings and will be folded to stand on the outside of the balloons to be turned and hold in sides of the face and whole head in place and to have a ribbon going in the lower part of the chin to hold it in place.

The unit mentioned above can be connected to the upper part of the back of the stroller or the back of the seats of the cars or car seats for children by use of simple ways such as use of Velcro TM patches or glues or screwing them, etc. When the child is in the seat, his or her head could be placed inside this unit, and the ends of the straps come together and attach by use of Velcro TM patches. The unit may also have a cover with layer or layers of sponges and soft fabric. When the child sleeps, his or her head could be put inside the wrap with its balloons inflated. When the balloon is inflated, this unit will assume its responsible shape to hold the head and the cervical spine in the desired position. The amount of the air inside the balloon can be adjusted to control the size and give the best use as well as the comfort needed. I do believe that when this piece is in place and functional, it will be very useful to prevent uncontrolled motion of the head during an accident. A similar thing may be used to hold the chest part in the right place when the child is sitting in the stroller or in the chair.

Another simple and useful way to use the head wrap will be to use a band of hard material such as aluminum of about 2 to 4 mm. thick and 2 to 4 cm. wide as the basic structure to hold the balloon. This can rotate around one hinge in each side of the back part allowing it to rotate back, away from the face and body, and to swing forward to stand in front of the frontal areas of the head where it can be functional. A small snap in the hinge will be made to prevent the hard part from falling lower than the horizontal or desired level. The inner surface of this hard band can be covered with balloons and its cover the same way which was explained earlier for the head wrap. This unit, when in place, can be rotated to stay in the rear of the back of the seat, and to be rotated forward to stand in the proper position in the front of the head. Then, the balloons will be inflated (in some cases they may be left inflated all around) and to assume their responsible role for holding and protecting the head of the person inside.

In this unit, the side balloons may also have an extension or be large enough to come to the sides of the face in order to cover them, and may also have narrow straps that come from the bottom end of the extension part of the side balloons to stick to each other with the use of Velcro TM patches or snaps to hold them together.

Wider Head Wrap

This is a unit similar to the head wrap except that it has larger balloons which will cover not only the sides of the head, but also the ears and side of the face. This may also have a band that comes from the lower ends of the support of the side balloons in order to connect together under the chin to hold the whole head more securely, preventing the head from slipping. This unit can be part of new back seats of the cars or strollers or in single car seats it can be held in place with the use of a wrap. This particular wrap will connect to back surface of the base of the balloons which is for the place for the back of the head. This wrap can go around the back of the chair and be held in place with its ends coming together with the use of Velcro TM. Naturally, the base or support part of this unit can be connected to different desired places with the use of different techniques: gluing, nailing, etc.; however, the basic things will be the same.

These models may also have a smaller strap to go from top border of each side strap to come together over the head and to be stuck together by Velcro TM to prevent the straps from falling down from their place.

Figure 5:
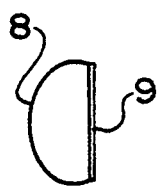
FIG. 5 shows the side view of the same balloon mentioned in FIG. 4. This view is to illustrate that the balloon can bulge with further inflation.

In FIGS. 1–5, No. 1 is the upper border of the balloon, No. 2 is the vertical line showing indentations, and No. 3 is the bulged area of the balloon. No. 4 shows the piece that allows the connection of straps. No. 5 is the left strap and No. 6 is the right strap. These straps are to go around the place and hold it in place. No. 8 is the bulged face of the balloon, and No. 9 shows the flat surface of the balloon. FIG. 5 shows that the balloon can bulge with further inflation.

Figure 6:
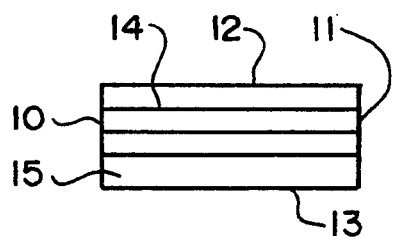
FIG. 6 shows the front view of a balloon similar to the one mentioned in FIG. 3.

FIG. 6 shows a front view of a balloon similar to the one mentioned in FIGS. 1–5. It shows how such balloon may be made from multiple horizontal sections. No. 12 is the upper edge, No. 13 is the lower edge, No. 10 is the right side, and No. 11 is the left side of the balloon. No. 14 is the horizontal line and No. 15 is the bulging surface of the balloon.

Figure 3:
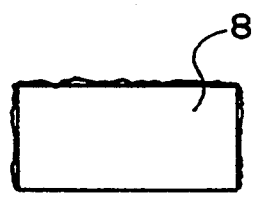
FIG. 3 shows the front view of a balloon as a single unit.
Figure 4:
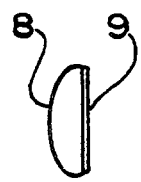
FIG. 4 shows the cross cut view of the balloon unit shown in FIG. 3
Figure 7:
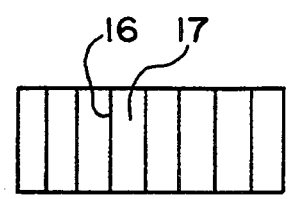
FIG. 7 shows another embodiment of balloon similar to the one mentioned in FIG. 3.

FIG. 7 shows a balloon similar to the one mentioned in FIG. 3, except that this balloon constitutes multiple vertical sections. No. 16 is the vertical line and border between the bulges, and No. 17 is the bulged surface.

Figure 8:
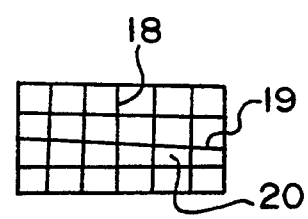
FIG. 8 shows still another balloon similar to the one mentioned in FIG. 3.

FIG. 8 shows how a balloon, similar to the one mentioned in FIG. 3, can be made with both vertical and horizontal sections, dividing it to multiple smaller balloons. The line 18 shows the linear vertical space between the balloons, and No. 19 shows the linear horizontal space between the balloons. No. 20 shows a unit balloon.

Figure 9:
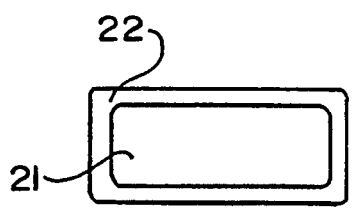
FIG. 9 shows the back view of a balloon similar to the one mentioned in FIG. 3.

FIG. 9 shows the back view of a balloon similar to the one mentioned in FIG. 3. The back area is flat and can be covered with Velcro TM surface to allow it to be attached to another area with matching part. No. 22 shows side of bulged balloon and No. 21 is the flat surface of the back.

Figure 10:
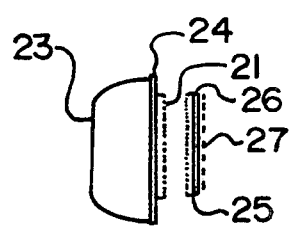
FIG. 10 shows the cross cut view of a balloon similar to the one mentioned in FIG. 9.

FIG. 10 shows the cross cut view of a balloon similar to the one mentioned in FIG. 9, except that this is to show the relative placing of the Velcro TM patches to hold it in place. In this, No. 23 is the bulged face, and No. 24 is the flat surface of the balloon The No 21 is the soft piece of Velcro TM, and No 25 is the coarse piece of the Velcro TM. No. 26 shows the cross cut of a film of glue which is applied to back of Velcro TM patch, and this film is covered then with a sheet of plastic No. 27 to protect it before use. At the time of use, the covering plastic will be removed to expose adhesive surface to stick to proper surface.

Figure 11:
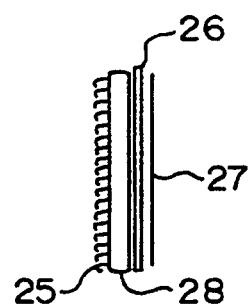
FIG. 11 is the enlarged cross cut view of the Velcro TM piece shown in FIG. 10.

FIG. 11 is the enlarged cross cut view of the Velcro TM piece shown in previous Figures. FIG. 11 shows the small brushes No. 25, the base 28, and the film of glue No. 26, and covering plastic No. 27.

Figure 12:
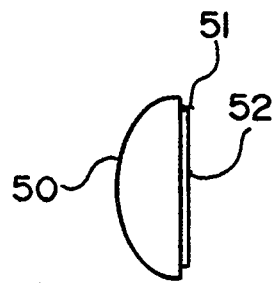
FIG. 12 shows the cross cut view of a balloon unit similar to the one mentioned in FIG. 3.

FIG. 12 shows the cross cut view of a balloon unit similar to the one mentioned in FIG. 3, except that this is a large balloon with its bulged surface shown at 50, and its flat surface shown at 51, and the Velcro TM surface at 52.

Figure 13:
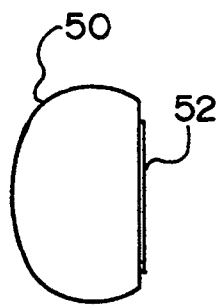
FIG. 13 shows the side view of the same balloon mentioned in FIG. 12. This view shows how the balloon can be made to bulge more when inflated more.

FIG. 13 shows the side view of the same balloon mentioned in previous Figure. This view shows how the balloon can be made to bulge more when inflated more.

Figure 14:
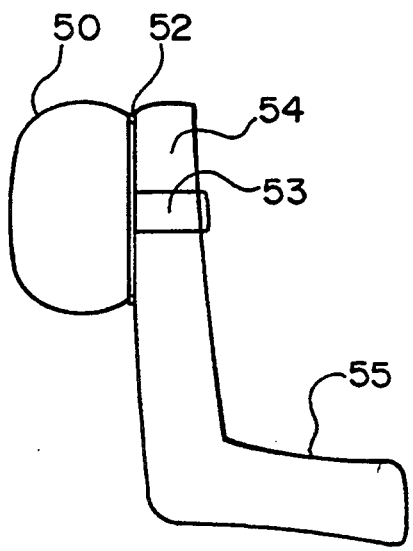
FIG. 14 shows the side view of a balloon similar to the one shown in FIG. 13 that is connected to the back of the front seat of a car.

FIG. 14 shows the side view of a balloon similar to the one shown in the previous Figures that is connected to the back of the front seat of a car, by a strap 53. Here the strap goes around the upper part of the seat to hold the balloon in place. The bulged surface is 50; the base of the balloon is No. 52. The No. 54 shows the upper part of the back of a car seat and No. 55 shows the sitting surface of the car seat. This view is to allow imagination to be used to show how this part can be protective to the person sitting in the back seat.

Figure 15:
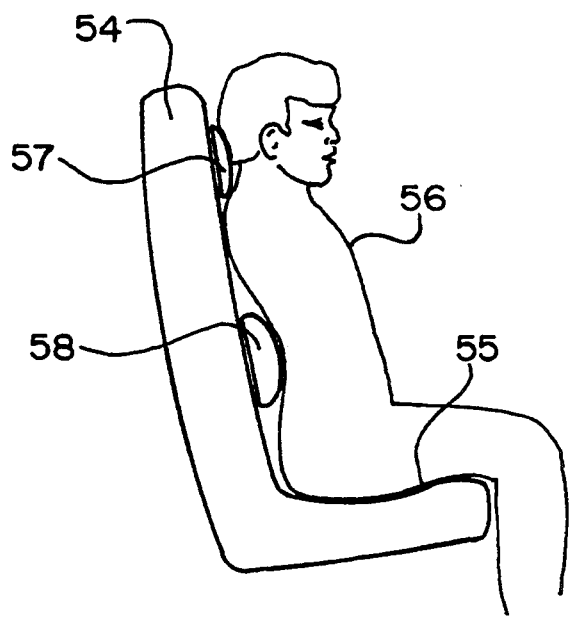
FIG. 15 shows the side view of two balloon units similar to the one mentioned in FIG. 3 that are placed in the neck and back areas in order to give comfort for the person in the neck and back area.

FIG. 15 shows the side view of two balloon units 57, 58 similar to the one mentioned in FIG. 3 that are placed in the neck and back areas in order to give comfort for the person in the neck and back area.

Figure 16:
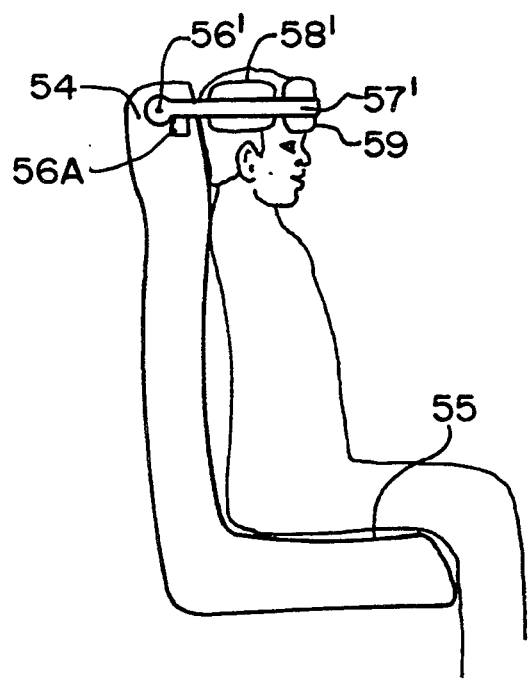
FIG. 16 shows the side view of a person using a bar covered by balloons while sitting in the front seat of a car or stroller.

FIG. 16 shows the side view of a person 56 using a bar covered by balloons while sitting in the front seat of a car or stroller. No. 54 is the upper end of the back of a car seat. No. 56' is a hinge, and No. 57' is the hard bar. No. 58' is a balloon standing in right side of the head and No. 59 is a balloon standing in the front of the head. No. 56A is a metal piece that will prevent the hard bar from coming lower than horizontal surface.

FIG. 17 shows a front view of a balloon 60 similar to one shown in FIG. 3 that has the inflation port 61 shown in right side which is like a small hose and a small cap 62 which will fit and seal the opening of the inflation port to prevent leakage of the air. The cap is connected with a small band to the inflation port.

FIG. 18 shows the cross cut view of the same balloon mentioned above, showing the bulged surface in the left 60 and the flat surface 63 in right side.

FIG. 19 shows a longitudinal cross cut view of the same balloon mentioned above. This view shows the bulged surface 60 and the flat surface 63 and the inflation port 61 with its cap 62.

FIG. 20 shows the back view of the same balloon shown in FIG. 17 mentioned above.

FIG. 21 shows the cross cut view of a balloon similar to one mentioned in FIG. 17 and this is to show how two flaps covered with Velcro TM in their ends may be used to attach such balloon to a bar or a strap. The bulging surface 60 is shown with flat surface 63 and upper flap 64 with its Velcro TM covered surface 65 and lower flap 67 with its Velcro TM covered surface 66. The Velcro TM covered surfaces 65 and 66 have matching parts that will stick to each other to hold the balloon in its place.

FIG. 22 shows the cross cut side view of a balloon similar to one mentioned in FIG. 17 and this is to show how this balloon may have a tunnel or multiple small tunnel-shaped spaces in its back to allow a strap or a band to go through it to be held in place securely. The bulging surface 60 is shown with flat surface 63 and the cover of tunnel 68 and the tunnel 69.

FIG. 23 shows the cross cut side view of a balloon similar to one mentioned in FIG. 17 and this is to show how this balloon may have few needles in its back to allow it to be stuck to a surface such as back of some car seats or area like that. The bulging surface 60 is shown with flat surface 63 and the needles 70.

FIG. 24 shows the cross cut view of the balloon unit shown in FIG. 17. This view shows the Velcro TM cover 71 in the right side.

Figure 25:
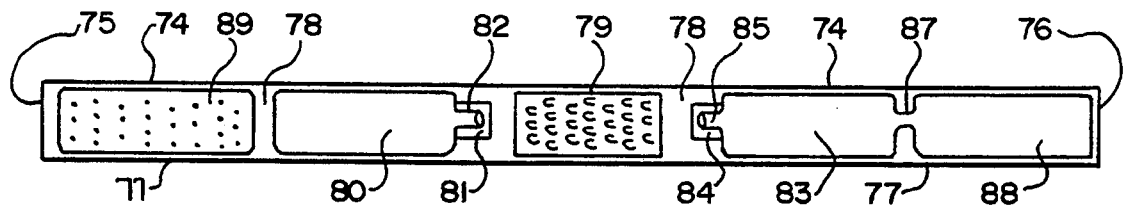
FIG. 25 shows the front view of the head wrap.
Figure 25A:
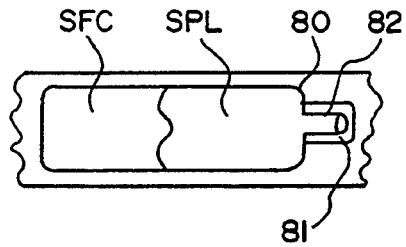
FIG. 25A is a broken-away view looking toward one of the balloons of FIG. 25, but showing a modified form.

FIG. 25 shows the front view of the head wrap. This view shows the basic strap 78 with its right end 75 and left end 76, upper edge 74 and lower edge 77. The strap has a Velcro TM covered area 79, which is to attach to back of seats or stroller, etc. There are three balloons on the strap, one 80 with its inflation port 82 that is located in front of opening 81 in the strap, and two balloons 83 and 88 connected to each other by a small opening 87. These balloons can be inflated by use of an inflation port 85 that is located in front of opening 84 in the strap. The Velcro TM end 89 is to match and stick to the area 90 in the back of the strap shown in FIG. 26.

Figure 26:
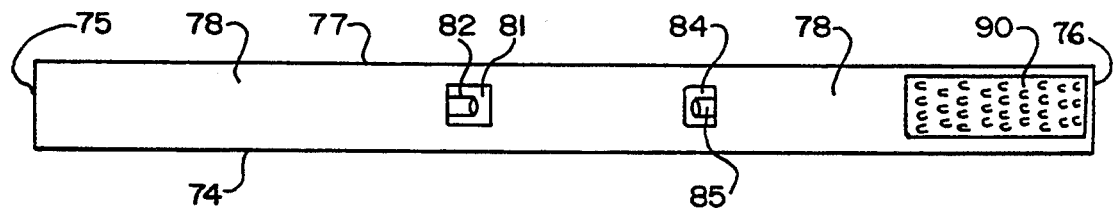
FIG. 26 shows the back view of the head wrap shown in FIG. 25.

FIG. 26 shows the back view of the head wrap shown in previous FIG. 25. In this, the basic body of strap 78 is shown with its right end 75 and left end 76, upper edge 74 and lower edge 77. The strap has a Velcro TM covered area 90. The inflation port 82 and its opening 81 are shown with inflation port 85 with the opening 84 for it in the strap. The Velcro TM end 90 is shown to match and stick to the area 89 of the strap shown in FIG. 25.

Figure 27:
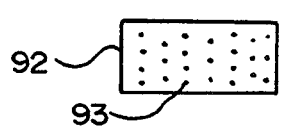
FIG. 27 shows the front view of a Velcro TM patch which is made to match the piece in the back of the head wrap shown in FIGS. 25 and 26.

FIG. 27 shows the front view of a Velcro TM patch 92 which is made to match the piece in the back of the head wrap shown in FIGS. 25 and 26. This piece will be stuck to any flat suitable surface that the head wrap is designed to attach. The small brushes 93 are shown.

Figure 28:
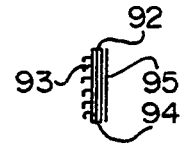
FIG. 28 shows the side view of the patch mentioned in FIG. 27.

FIG. 28 shows the side view of the patch mentioned in previous Figures. The brushes 93 are shown in left side, and the base 92 with the film of adhesive 94 covered with plastic 95. The covering plastic 95 will be removed to expose the sticky surface 94 for sticking to the surface that is to be used.

Figure 29:
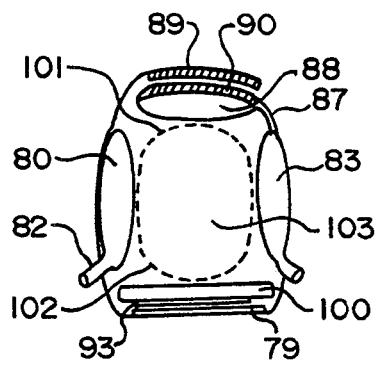
FIG. 29 is a cross section of the head wrap when it is in its position around the head.

FIG. 29 is a cross section of the head wrap when it is in its position around the head. The head 103 is sitting in its place in front of area 100. This view illustrates one Velcro ™ patch 93 stuck to back of area 100 and the Velcro ™ patch 79 from strap is stuck to it. The strap goes around right and left side of the head to come together in front of the head. The balloon 83 is standing in right side of the head and the balloon 88 stands in front of the front of the head. The balloon 80 stands in front to left side of the head with its inflation port 82 shown here. The Velcro ™ patch 90 is in contact with Velcro ™ patch 89 to hold the whole unit in place.

Figure 30:
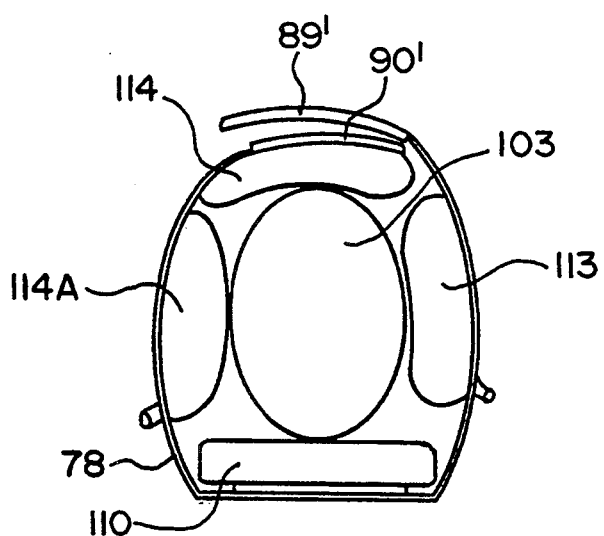
FIG. 30 shows cross cut view of the head inside a head wrap similar to one shown in FIGS. 25 and 26.

FIG. 30 shows cross cut view of the head 103 inside a head wrap similar to one shown in FIGS. 25 and 26. In this view, the head is sitting against top of the back of stroller 110 or similar place, and the head wrap is attached to the back of the seat in its center. Two balloons 114A, 114 are standing against the side of the head and front. One balloon 113 in right side is standing against right side of the head. This wrap will be held in place when back of the left side of wrap attaches to the inside end of the right side wrap, and their Velcro ™ covered ends 89', 90' stick to each other.

Figure 31:
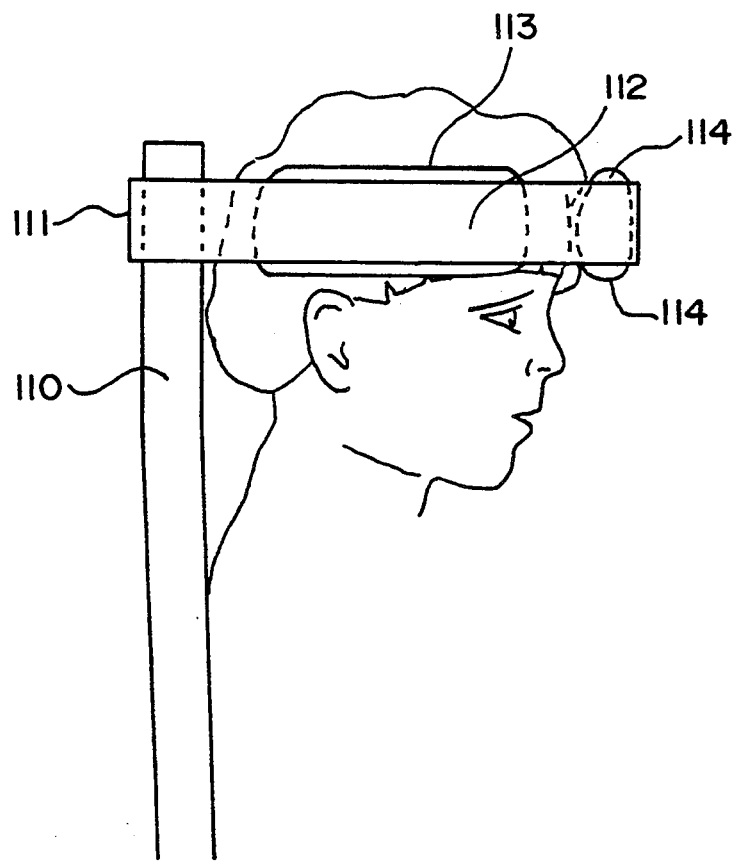
FIG. 31 shows the side view of the head inside the head wrap of FIG. 30 when the head wrap is in place.

FIG. 31 shows the side view of the head inside the head wrap when the head wrap is in place. Here the upper part of a stroller seat is shown in the left 110. The strap is attached to the upper back at 111 and it goes around the head, and allows the balloons 113 and 114 to be located in their proper place against the head to support the head. In some models, the balloon 113 and its matching part in the other side may be made large and supported by hard plastic to cover the ears and the side of face next to them too. And, a band may be used to go from bottom of the chin to hold these two balloons together.

Figure 32:
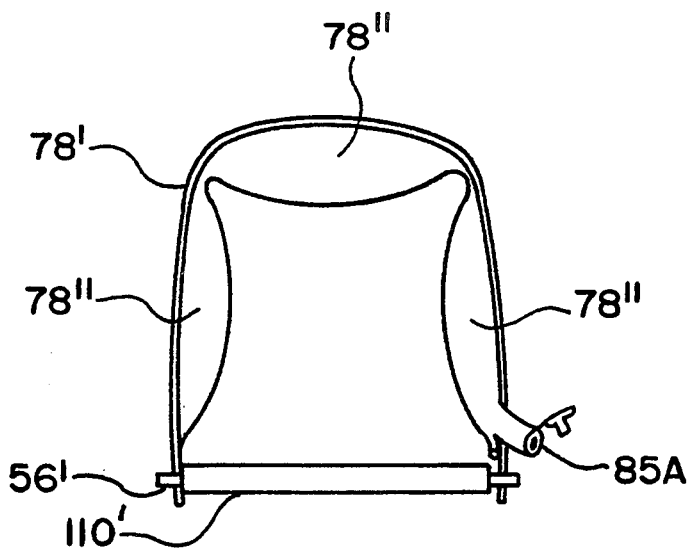
FIG. 32 shows the horizontal cut of the head wrap made from a hard supporting band around it.

FIG. 32 shows the horizontal cut of the head wrap made from a hard supporting band 78' around it, made from aluminum, hard plastic, or similar material. The balloon 78" is covering inside of this band, in front part and in its sides. The inflation port 85A is shown in the right side. In this picture, the back of upper part 110' of the stroller is shown in the bottom, with one hinge 56' in each side holding the aluminum band in the sides.

Figure 33:
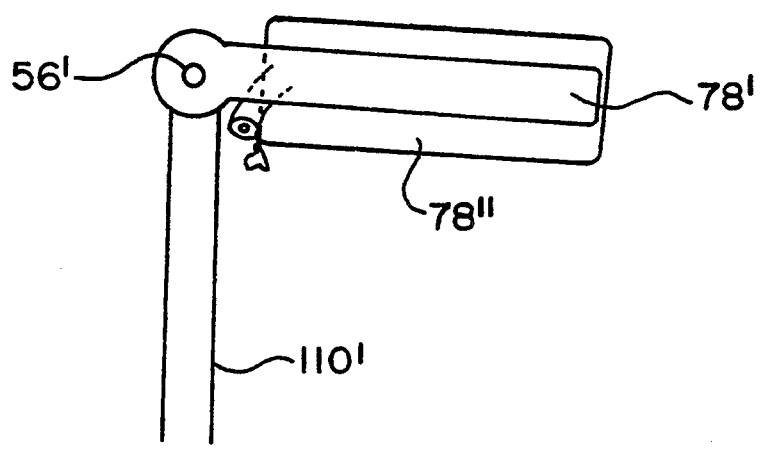
FIG. 33 shows the side view of the head wrap mentioned in FIG. 32.

FIG. 33 shows the side view of the head wrap mentioned in FIG. 32. In this view, the back of the stroller or the chair is in the left side with a hinge in the top. The supporting hard part is like a band around the balloon and the balloon is also shown.

Figure 34:
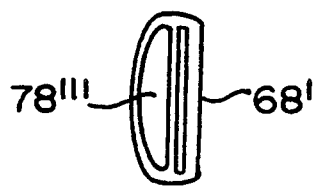
FIG. 34 shows the cross cut view of a balloon with a tunnel in its back that will allow it to be pulled over a band of plastic or aluminum.

FIG. 34 shows the cross cut view of a balloon 78''' with a tunnel in its back 68' that will allow it to be pulled over a band of plastic or aluminum.

Figure 35:
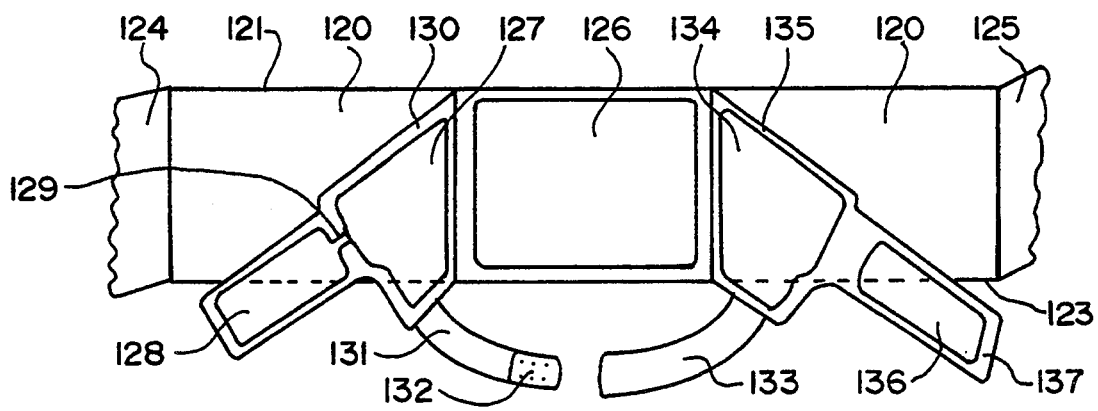
FIG. 35 shows a different type of head wrap.

FIG. 35 shows a different type head wrap, which is basically the same kind of a wrap shown previously in FIG. 25 and 29. However, here the wrap has a balloon 126 in the back for the back of the head to stand against it and the side balloons 127 for the right side of the head and face and 134 for the left side of the head and face. Balloons 127,134 are larger balloons to cover those areas. They are protected by the back cover 130 for the right side and 135 for the left side. The balloon 128 for the front is shown and is connected to the balloon of the right side of the face with small connection 129. The flap 137 has the Velcro ™ cover 136 and will connect to the back of the front balloon 128. The balloons are connected to a structure that holds them in place, and that structure is shown here in No. 120, and the initial portion its right end 124 and left end of 125 are also shown. The supporting right 130 and left 135 parts that hold the right and left balloons, respectively, have a lower band 131 and 133 that will come under the chin to connect to each other with a small piece of Velcro ™ patch 132 in the right. The left patch is not shown in this picture, and these bands, when connected, will help the whole unit do the job efficiently.

Figure 36:
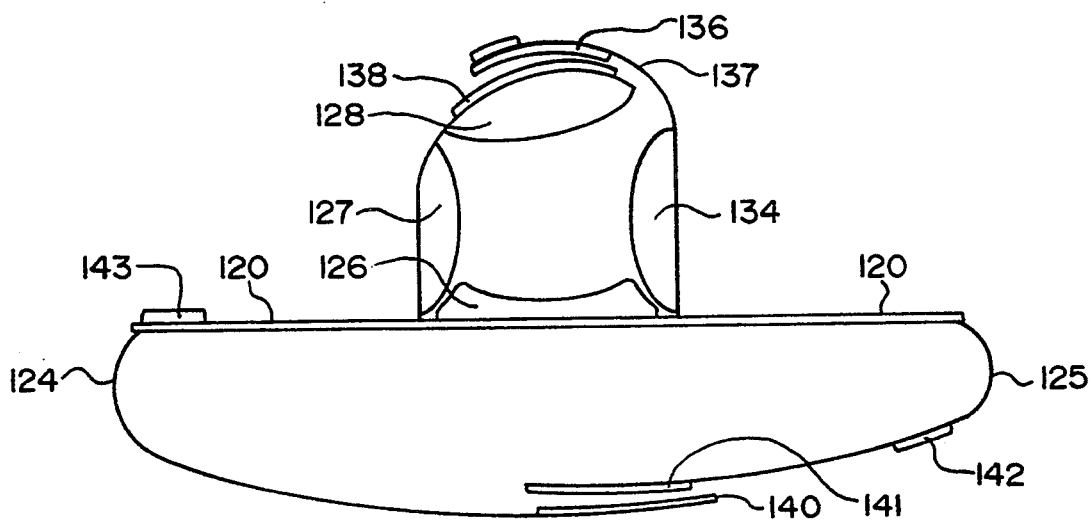
FIG. 36 shows a longitudinal cross cut view of the wrap shown in FIG. 35 in a wrapped condition.

FIG. 36 shows a longitudinal cross cut view of the wrap shown in previous FIG. 35. In this view, the supportive structure 120 is shown with its left end 125 and right end 124 extending to continue and end with Velcro ™ patches 141 and 140, respectively. The balloon 126 is in center with the balloon 127 to the left and 128 further away to the left. The Velcro ™ face 138 covers the back of balloon 128 which is for the front. The left balloon 134 continues with the strap 137 that ends with a Velcro ™ patch 136 standing adjacent Velcro ™ patch 138 in the back of front balloon 128. It also has small patch 139 in its back which is shown better in FIG. 37.

Figure 37:
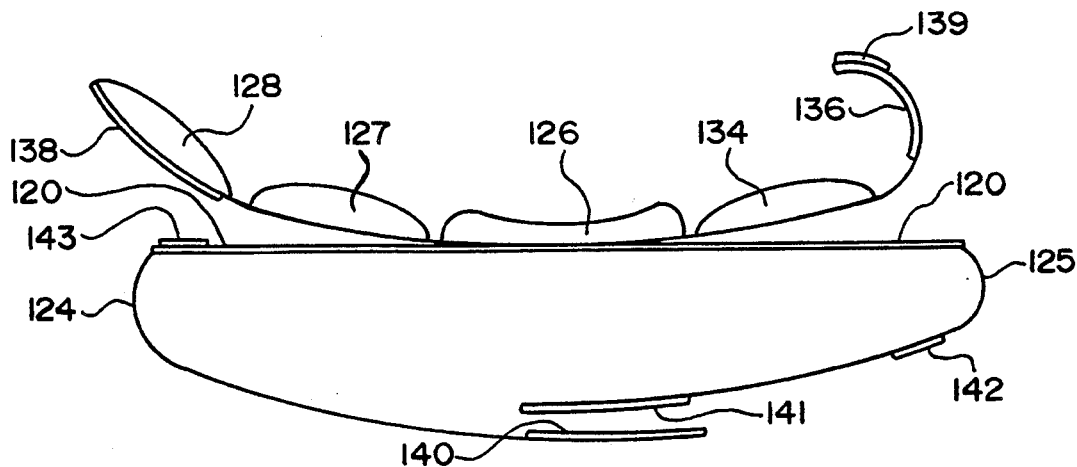
FIG. 37 shows a longitudinal cross cut view of the wrap shown in FIG. 35 in an unwrapped condition.

FIG. 37 shows a longitudinal cross cut view of the wrap shown in previous FIG. 35. In this view, the supportive structure 120 is shown with its left end 125 and right end 124 extending to continue and end with Velcro ™ patches 141 and 140, respectively. The balloon 126 is in center with the balloon 127 to the left and 128 further away to the left. The Velcro ™ face 138 covers the back of balloon 128 which is for the front. The left balloon 134 continues with the strap, the ends having Velcro ™ patches 136 in balloon side and 139 in its back. When the balloons are open, the Velcro ™ patch 139 will connect to 142, and the Velcro ™ patch 138 to 143 to have the balloon stable in the back of the seat.

What is claimed is:

1. A device adapted to support the head of a seated user relative to a generally upstanding portion of a seat, stroller, or the like, comprising a strap adapted to encircle the head of the user and said generally upstanding portion, said strap comprising a plurality of inflatable balloons having generally flat rear surfaces and expandable frontal surfaces, whereby upon inflation the generally flat rear surfaces of the balloons remain flat, and the frontal surfaces bulge outwardly from the rear surfaces to contact and support the user's head.

2. A device as set forth in claim 1 in which said plurality of balloons comprise a first balloon for contacting the user's forehead, a second balloon for contacting the right side of the user's head, and a third balloon for contacting the left side of the user's head.

3. A device as set forth in claim 2 in which a conduit means places said first balloon and one of said second and third balloons in communication, said first balloon and said one of said second and third balloons are inflated via a first inflation port and the other of said second and said third balloons is inflated via a second inflation port that is separate from said first inflation port.

4. A device as set forth in claim 2 in which said strap comprises a fastening system for separably fastening a first portion of said strap to a second portion of said strap when said strap is encircling the head of the user and said generally upstanding portion of a seat, stroller, or the like, said first portion of said strap being a portion of said strap that contains said first balloon, and said second portion of said strap extending from that portion of said strap containing said third balloon to overlap said first portion of said strap, said fastening system acting between said first and second portions of said strap at the overlapping of said first portion of said strap by said second portion of said strap.

5. A device as set forth in claim 4 in which said strap comprises, between said second and said third balloon, a portion of a further fastening system adapted for fastening with a complementary portion of such further fastening system disposed on said generally upstanding portion of a seat, stroller, or the like when said strap is encircling the head of the user and said generally upstanding portion of a seat, stroller, or the like.

6. A device as set forth in claim 2 in which said strap comprises, between said second and said third balloon, a portion of a fastening system adapted for fastening with a complementary portion of such fastening system disposed on said generally upstanding portion of a seat, stroller, or the like when said strap is encircling the head of the user and said generally upstanding portion of a seat, stroller, or the like.

7. A device as set forth in claim 2 in which at least one of said balloons comprises a soft fabric cover.

8. A device as set forth in claim 2 in which at least one of said balloons comprises a sponge layer.

9. A device as set forth in claim 2 in which at least one of said balloons comprises a soft fabric cover and a sponge layer.

* * * * *